May 13, 1930.  L. L. IRVIN  1,758,795
PARACHUTE RIP CORD CONSTRUCTION
Filed March 26, 1928   2 Sheets-Sheet 2
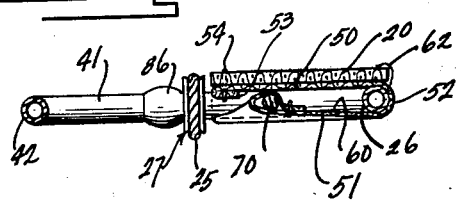
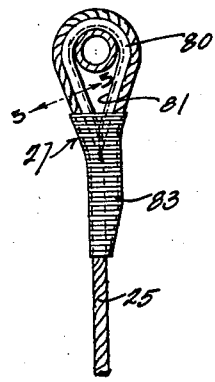
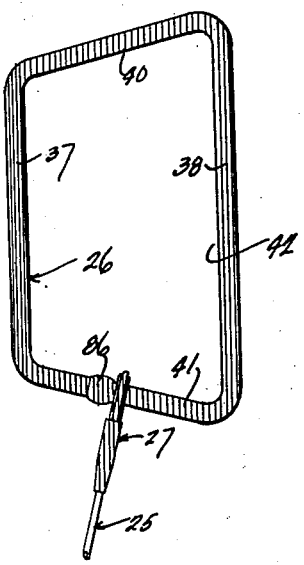
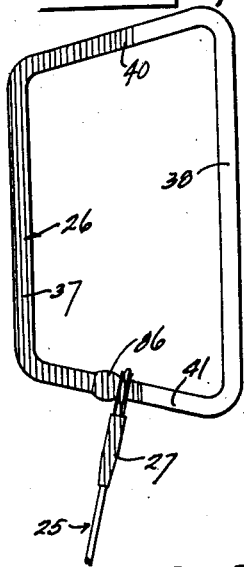
Leslie L. Irvin.
Inventor Patented May 13, 1930

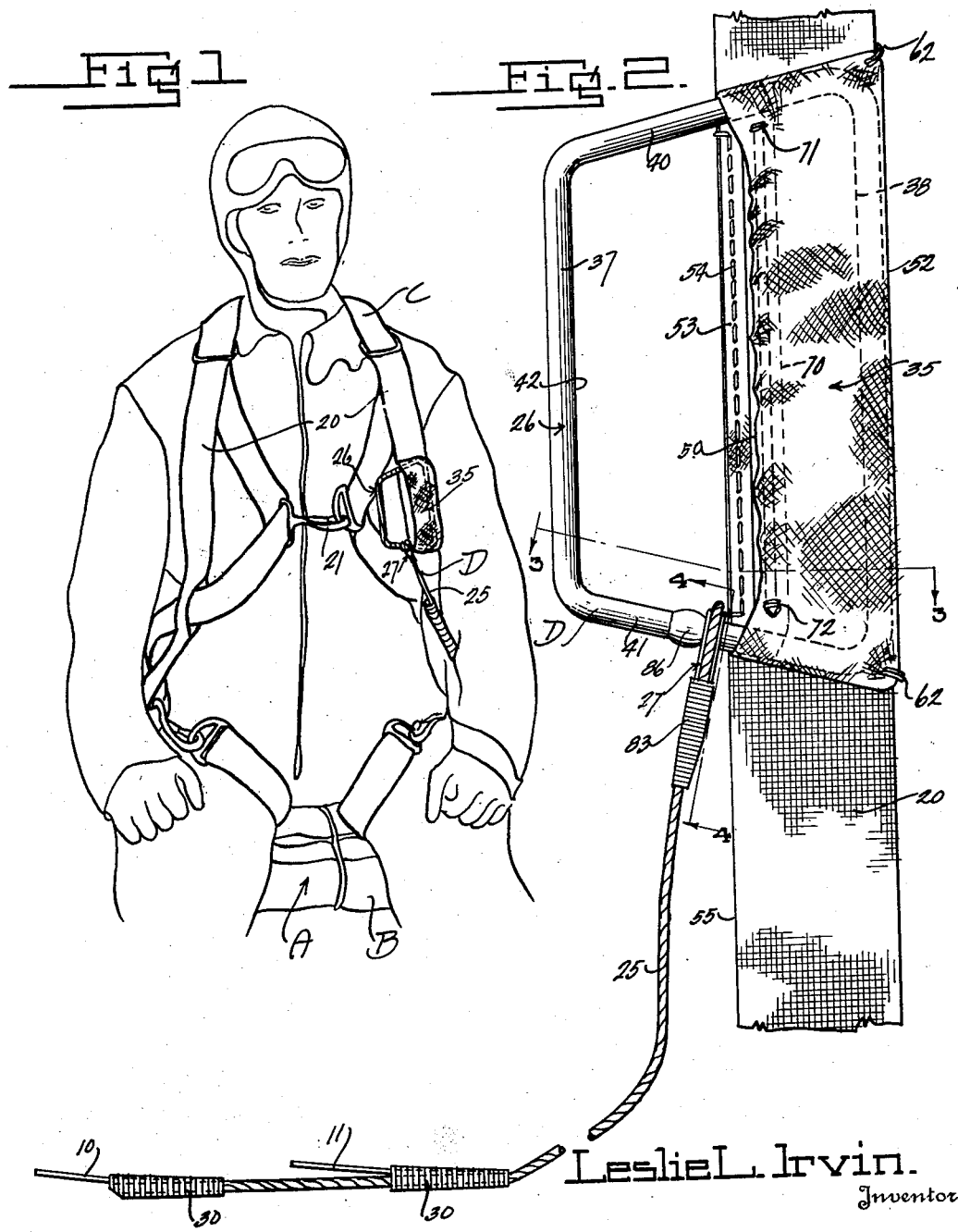

1,758,795

UNITED STATES PATENT OFFICE

LESLIE L. IRVIN, OF BUFFALO, NEW YORK, ASSIGNOR TO IRVING AIRCHUTE COMPANY, INC., OF BUFFALO, NEW YORK, A CORPORATION

PARACHUTE-RIP-CORD CONSTRUCTION

Application filed March 26, 1928. Serial No. 264,844.

This invention relates to improvements in parachutes.

The primary object of this invention is the provision of an improved rip cord for parachutes. It is generally recognized that the free jump parachute pack gives the highest factor of safety. With such type of parachute the rip cord which releasably holds the pack closed has a hand grasping member which is detachably affixed some place on the harness or clothing of the wearer where it can be grasped by the parachutist after the jump from the aircraft has been made. Airplane pilots and other aircraft operators and passengers are generally clumsily dressed, for obvious reasons, and gloves are generally worn for air travel. While these conditions have heretofore been known, there has not been a rip cord having a handle which may be conveniently grasped by a jumper to effect the parachute release. The rip cord handle of the present standard U. S. Government parachute is of ring-shaped formation and carried on the harness of the wearer, on the left side of the wearer at the front; a portion being contained in a pocket and portion being disposed therefrom for grasping. The circular shape of the ring handle now used does not readily lend itself to easy grasping. Therefore, I have developed a parachute rip cord with a novel handle which may be conspicuously and securely and releasably attached on the harness of the wearer with a large loop portion thereof exposed for facile grasping to permit of an operation of the rip cord when making the jump.

At the instant of making the jump, a parachutist becomes confused and frightened to a considerable degree, for natural reasons which are not hard to understand, and instances are on record where the confusion has been so great that a considerable period elapsed before the parachutist found the rip cord handle. In the very first emergency parachute jump made with the present standard U. S. Government parachute, the jumper had great difficulty in finding the rip cord handle, even grasping the leg straps of the harness to find it. Very often the parachute jumper, in case the jump is an emergency jump, is not familiar to any appreciable extent with the details of parachute construction. If the rip cord on such an occasion is not convenient for grasping, it can readily be understood that fatality might result. There are other cases on record where the jumper seeking to grasp the rip cord handle grasped and pulled the pocket of the handle, even to the extent of tearing it loose. Delays in opening the parachute, for low altitude drops, are of course very necessary to obviate. Therefore, as an improved feature of rip cord construction I provide a rip cord having a handle with a large loop portion exposed for convenient grasping so that the harness and pocket need not be taken hold of by the operator; the handle preferably being conspicuously placed at the front of the operator, and contrasted with the harness, the pocket, and other features of the clothing and parachute apparatus by painting it in a sharply contrasting and preferably brilliant color, such as red, yellow, or the like.

In the present standard parachute used by the air forces of the United States Government, the rip cord handle connection with the cord body is to a certain extent concealed from view, and in some instances deterioration and wear on the parts have resulted; which occurrence might have resulted in fatality. It is an important object of this invention to provide a rip cord having a preferably flexible cord body, with a rigid handle having a movable connection therewith, in such manner that the coupling or connection of these parts is entirely exposed to view.

Other objects and advantages of this invention will be apparent during the course of the following detailed description.

In the accompanying drawings, forming a part of this specification, and wherein similar reference characters designate corresponding parts throughout the several views, Figure 1 is a fragmentary view showing an airplane pilot wearing the approved type of parachute apparatus such as manufactured by the Irving Airchute Company, of Buffalo, New York, including as a part thereof the improved rip cord and its connections shown in a readily accessible position for easy operation.

Figure 2 is a front elevation of the improved rip cord handle, showing the same with the rip cord attached thereto, and with the handle in its detachable relation within a fabric pocket attached to a part of the harness.

Figures 3 and 4 are cross sectional views taken substantially on their respective lines in Figure 2 of the drawings.

Figure 5 is a cross sectional view taken substantially on the line 5—5 of Figure 4.

Figures 6 and 7 are front elevations of the handle portions of the rip cord, showing how the same may be colored to contrast with other features of the parachute and clothing of the operator.

In the drawings, wherein for the purpose of illustration are shown preferred and modified forms of the improved rip cord construction, the letter A may generally designate parachute apparatus which may consist of a pack B, suitably attached to harness C, and having associated therewith an improved rip cord construction D.

The pack B may be attached to the harness C in any of the well known positions, such as at the seat, at the back, or at the front of the wearer, and the pack as is well known includes a preferably flexible container having flaps provided with grommets (not shown), through the eyelets of which pins, such as pins 10 and 11 of the rip cord D, are releasably inserted, to hold the flaps of the container closed when the parachute is folded therein, as will be well understood by those skilled in this art, and which is particularly shown in the Floyd Smith Patent #1,403,983, patented January 17, 1922.

The harness C is preferably of the type set forth in the G. M. Ball Patent #1,560,366, patented November 3, 1925, and includes the straps 20 forming a sling which extends beneath the seat of the aviator and upwardly forwardly of the aviator and to the back of him, suitable means 21 being provided for connecting the straps at the front of the aviator or parachute jumper. It is on one of the straps 20 that the parachute rip cord ring is conventionally secured within a pocket.

Referring to the rip cord construction D, the same includes the flexible cord body 25 secured movably to the loop handle 26 by means 27, and in a manner entirely novel.

The cord body 25 is of flexible character, formed of a plurality of spirally wrapped wire strands. At the parachute pack engaging end of the cord 25, the cord body is provided with the pins 10 and 11, best shown in Figure 2 of the drawings. The pins 10 and 11 are secured by spirally wrapping copper wire 30 about ends of the pins 10 and 11 which are ground to fit against the cord body 25; the copper wire then being soldered and polished smooth. This fixedly secures the detent pins 10 and 11 in place against liability of detachment.

The handle 26 of the rip cord construction is of novel formation especially constructed to permit a person to readily grasp the same, and at the same time being of a shape which will permit of its secure yet detachable connection within a simple form of pocket 35 provided therefor, and usually placed upon one of the harness straps 20 of the harness C. This handle 26 is preferably formed of tubular steel material, although it may be of other material, and solid if desired. It is preferably bent from a length of bar material to the form shown and to be subsequently described, and the ends then welded permanently. Its main characteristic is that the same is not circular, in contradistinction to the present circular rip cord ring, and because of this it may be shaped to provide an elongated opening in that portion which extends from its pocket 35, into which the jumper may with facility slip his or her hand quickly and without fumbling. The handle 26 is preferably in the form of a trapezoid, the non-parallel sides of which are divergent in equal angular relation with respect to the parallel sides. The shape, however, may vary, except so far as its retaining cooperation with its pocket is concerned. As shown in Figure 2, and also Figures 6 and 7, the handle 26 includes the parallel preferably straight portions 37 and 38; the latter being the longer, and the ends of which are connected by the non-parallel sides 40 and 41 diverging from the ends of the portion 37 to the ends of the portion 38, and making equal angles at their connections with the ends of the portions 37 and 38. The opening 42 formed in the handle 26 has its length parallel with the sides 37 and 38, that is, it is longer in this direction than the depth normal to the sides or portions 37 and 38.

The pocket 35 is preferably of flexible material, such as cotton duck, and it includes a back portion 50 and a front movable portion 51, formed by doubling material upon itself at the closed edge 52 of the pocket. A hem is provided on the back 50, at the opening to the pocket, and along this hem the back 50 is stitched at 54 longitudinally to the harness strap 20, in parallelism with a side edge 55 of the harness. The material of the portions 50 and 51 of the pocket at the ends of the pocket are suitably sewed together so that the pocket opening 60 extends for only the width of the harness strap 20, but it is relatively long. The corners of the pocket 35 at the bottom of the pocket are secured by stitching 62 to the harness strap 20, as shown in Figure 2. The stitching 54 at the opening to the pocket is only of such length that the pocket at its opening may be restricted.

This restriction is normally accomplished by providing an elastic cord of suitable resilient material, shown at 70 in Figures 2 and 3 of the drawings, which is secured at its ends at 71 and 72 to the pocket front 51; the material of the front 51 being doubled inwardly to receive the elastic 70, in the nature of a draw string. The action of the elastic is to restrict the opening to the pocket so that the pocket normally assumes a sort of trapezoidal shape in conformity to the shape of the rip cord handle 26, as can readily be understood from Figure 2 of the drawings. The pocket is much shallower than ordinary pockets provided for rip cord rings and the like, and it is much longer, conforming in depth to the width of the harness strap on which placed, which is a desirable feature.

The handle 26 to be placed in the pocket 35 necessitates that the elastic 70 be stretched, and the handle at the side portion 38 is placed in the pocket opening, and it is apparent that the elastic 70 draws the material of the pocket snugly into conformity about the divergent sides 40 and 41 of the handle, to hold the latter in place on the harness strap against liability of accidental detachment. The width of the handle 26 is such with respect to the depth of the pocket that substantially one-half of the width of the handle protrudes from the opening of the pocket, beyond the edge 55 of the strap 20, providing a relatively long opening which is not very wide, but which will enable a person to readily insert his hand and fingers to grasp the handle with ease and without fumbling.

In the rip cord ring as used upon the present standard Government parachutes in the U. S. air forces, the material of the rip cord body is carried inside of the tubular rip cord ring, and the connection made in such a manner that if corrosion or deterioration in material develops within the tube it is not observable. To obviate the disadvantages resulting from defective material which is not in a position to be seen, I connect the rip cord body to my handle 26 with a connection that is entirely exposed to view, and any wear and deterioration is readily observable for inspection. To this end, I employ the construction illustrated in Figures 2 to 5 inclusive, that is, I provide a substantially pear-shaped thimble or frame 80, having an opening 81 through which the material of the handle is looped. In cross section the thimble 80 is concavo-convex, with the concave side or groove facing outwardly and peripherally extending about the same, and about which the material of the cord body 25, at the end of the latter, is placed, and the end of the cord 25 doubled upon itself, as shown in Figure 4, and wrapped in place by means of copper wire 83, which secures the thimble 80 at its split end in place, and holds the cord material wrapped about the thimble in the relation illustrated in Figure 4. The cord material thus cannot slip from the thimble 80, and the latter provides a frame having an opening through which the handle 26 is slidable.

In order to permit some relative pivoting movement between the handle 26 and the connection 27, and yet prevent the connection 27 from sliding upwardly into an obstructing relation on the handle exposed from the pocket, I provide a bulge or obstruction 86, preferably on the portion 41 of the handle 26, in closed spaced relation with the location where said portion 41 extends from the pocket 35, when the handle is in place therein, as shown in Figure 2. The connection 27 is thus held in place between the construction 86, which is large enough so that the thimble 80 cannot pass thereover, and the pocket 35, so that the rip cord body at its connection 27 cannot move upwardly upon the handle 26 and obstruct the grasp of a person thereon when it is desired to pull the release cord. The bulge 86 may be the place where the ends of the handle are welded together after bending into position.

In order that the handle of the release cord will be the most conspicuous article on the parachute apparatus worn by the aviator or aircraft passenger, I propose to brilliantly color the handle 26 as shown in Figure 6, together with the connection 27, or at least to color that portion of the handle 26 which normally protrudes from the pocket 35, as shown in Figure 7. Thus the handle and the rip cord connection 27 are color contrasted with other parts of the parachute apparatus and serve to direct the attention of person who puts on the parachute, to the release cord or rip cord handle, and the position of the release handle is thus firmly fixed in the parachute wearer's mind. The brilliant color, which is preferably red, is within the range of vision of the wearer at all times, being slightly to the left of the breast of the wearer.

Various changes in the shape, size, and arrangement of parts may be made to the forms of the invention herein shown and described, without departing from the spirit of the invention or the scope of the claims.

I claim:

1. In parachute apparatus, harness including a strap having an elongated pocket thereon provided with an elongated pocket opening facing one side edge of the strap, said pocket at its open side being secured for a portion of the length thereof along the strap, the pocket at the opposite edge of the strap being secured at its corners to the strap, elastic means cooperating on the pocket to normally restrict the length of the opening at the entrance of the pocket, a pack, and rip cord means for the pack including a non-circular handle with a portion normally restrained in the pocket by the action of said elastic means.

2. In parachute apparatus the combination of a pocket having an entrance opening, and a parachute rip cord including a flexible cord body having a handle of polygonal formation movably connected to the cord at a side thereof, with the cord connection slidable along said side, said handle being of such depth that when a portion is inserted into the pocket, the remaining portion protrudes therefrom, including the cord connection on the handle and an obstruction on the side of the handle at the opposite side of the connection of the cord body on the handle from the pocket to limit the sliding action of the cord connection upon said handle when inserted in said pocket.

3. In a parachute rip cord the combination of a rip cord body, a handle having an elongated hand grasping bar with an elongated hand inserting opening therealong to facilitate insertion of an operator's fingers and hand for the purpose of grasping the same, the handle having the outer side marginal edges divergently extending away from the ends of the hand grasping bar, and means connecting the rip cord body to the handle at a location spaced from the hand grasping bar so as not to interfere with an efficient hold by an operator upon the hand grasping bar.

4. As an article of manufacture a rip cord comprising a handle formed of bar-like material in the shape of a trapezoid and comprising boundary bar portions, each of substantially uniform cross section, said bar portions comprising parallel bar portions of unequal lengths and connecting side bar portions divergently extending from the ends of the above mentioned portion of least length to the ends of the above mentioned bar portion of greater length, said bar portions each being substantially straight and providing a loop-like handle having a substantially trapezoidal opening therethrough, a rip cord body connected upon one of the divergent bar portions intermediate the ends thereof, said cord body having an eye through which the divergent side bar portion of the rip cord handle is threaded with an exposed loose connection, and means on a bar portion of the rip cord handle for limiting the amplitude of movement of the rip cord connection along said handle.

5. In parachute rip cord apparatus an elongated shallow supporting pocket provided with a restricted opening thereto, an elongated shallow rip cord handle of greater depth than the pocket formed of bar material and having a hand grasping bar and opposed side marginal portions diverging from the ends of the hand grasping bar, the handle at its widest part being adapted to be frictionally retained in the pocket with the hand grasping bar protruding therefrom and the divergent side bar portions in frictional binding relation with the ends of the pocket, a rip cord body having a movable exposed connection upon one of the divergent side bar portions of the handle exteriorly of the pocket at an end of the pocket, and means on said bar portion for limiting the movement of the rip cord connection towards the hand grasping portion of the handle.

6. In a parachute rip cord and handle construction, the combination of a handle having a hand inserting opening therethrough and with the opposite outer side edges convergent from a wider end of the handle towards an opposite narrower hand hold end portion forming a boundary of said opening, and a flexible rip cord body connected to the handle in a loose slidable relation at a location spaced from the narrow hand hold portion of the handle, said handle at the location of connection of the rip cord therewith having an obstruction preventing movement of the rip cord towards the hand hold portion.

7. In a parachute rip cord and handle construction the combination of a handle formed of bar material of substantially uniform cross section throughout and bent into substantially the shape of a trapezoid, comprising parallel bar portions of unequal length, the shortest of which forms a hand grasp portion, and side bar portions connected at the ends of the hand grasp portion and extending therefrom divergently towards their connection with the ends of the longer of the parallel portions, a flexible rip cord having detent pins on one end and an exposed loose eye connection on a bar portion of the handle at its opposite end, said bar portion of the handle on which the rip cord is connected having an annularly bulged obstruction of a size to prevent movement of the rip cord at its connection with the handle upon the hand grasp bar portion of the handle.

8. In a parachute rip cord construction, the combination of a rip cord body having means to act in releasably restraining opening of a parachute pack, a relatively flat rigid handle having the outer peripheral shape of a trapezoid and having a hand inserting opening therethrough and an elongated hand grasping bar bounding said opening and forming the shorter of the parallel sides of the trapezoid outline of the handle, and means connecting the rip cord body to the handle at a location thereon spaced from the hand grasping bar so as not to interfere with an efficient hold by an operator upon the hand grasping bar.

9. In a rip cord device for parachutes, the combination of a rigid handle comprising an elongated hand grasping bar having side portions at opposite ends of the hand grasping bar extending in the same general direction transversely from said hand grasping bar, said side portions being spaced to provide a wide hand opening therebetween which will permit the fingers of an operator to quickly and comfortably fit therethrough when grasping the hand grasping bar, a flexible rip cord body attached to the handle at a location spaced from said hand grasping bar, and contractible elastic attaching means releasably clamping upon the outer edges of said side portions at locations spaced from the hand grasping bar, said outer edges of the side portions being shaped so that the outer dimensional width of the handle where the contractible elastic attaching means clamps thereon is less than the outer dimensional width of the handle adjacent thereto in the direction away from said hand grasping bar.

10. In a rip cord device for parachutes, the combination of a rigid relatively flat handle comprising an elongated hand grasping bar having side bars connected at opposite ends of the hand grasping bar and extending therefrom in relatively divergent relation transversely with respect to said hand grasping bar, said side bars being spaced to provide a wide opening therebetween which will permit the fingers of an operator's hand to quickly and comfortably fit therethrough when the hand grasping bar is held by an operator, a flexible rip cord body attached to the handle at a location spaced from the hand grasping bar, and means for holding the handle upon the person of an aviator comprising a flexible expansible loop receiving the ends of the side bars therein at a location remote from the hand grasping bar in a contracted clamping relation thereon for releasably supporting the handle in place.

11. In parachute rip cord apparatus the combination of a rip cord body, a handle having an elongated hand inserting opening to facilitate free insertion of an aviator's glove covered fingers and hand and bounded at one longitudinal side by a long hand grasping bar, the handle remote from the hand grasping bar having relatively spaced portions with side marginal edges relatively inclined in a direction transverse from said hand grasping bar, means connecting the rip cord body to the handle at a location spaced from the long hand grasping bar, and expansible holding means releasably clamping upon the relatively inclined edges of the said spaced portions of the handle.

LESLIE L. IRVIN.